UNITED STATES PATENT OFFICE 2,288,314

METHOD OF IMPROVING YEAST

Leo M. Christensen, Atchison, Kans., assignor to The Chemical Foundation, Incorporated, a corporation of Delaware No Drawing. Application June 25, 1937, Serial No. 150,417

1 Claim. (Cl. 195—79)

This invention relates to the production of alcohol by fermentation, more particularly to the production of ethyl alcohol by fermentation of the Jerusalem artichoke (*Helianthus tuberosus*) and similar tubers such as the Compositae.

The present application relates to subject matter, in part disclosed, but not claimed in prior application, Serial No. 54,373, filed December 14, 1935, now Patent No. 2,085,003, issued June 29, 1937.

As is known, the diffusion liquor obtained from the Jerusalem artichoke is rich in carbohydrates. Such liquor contains an appreciable percentage of the readily fermentable monosaccharides, levulose and glucose. This liquor however also contains a relatively large percentage of polysaccharides, largely in the form of polylevulosans, and some non-sugars.

The availability of this raw material for the production of alcohol has been recognized and processes involving its use have been carried out. In the past, the methods employed have involved a typical two-phase fermentation process. The first phase comprised the preliminary hydrolysis of the polysaccharides to simple fermentable sugars, by means of mineral acids or specific enzymes. The second phase consisted in the fermentation of these sugars, together with the monosaccharides originally present, by means of typical yeasts, for the purpose of producing ethyl alcohol. If such diffusion liquor were directly subjected to fermentation, with the yeast ordinarily employed in the fermentation industries, only about 75 per cent. of the total carbohydrate content is converted. By carrying out the preliminary acidic or enzymatic hydrolysis described, the conversion is increased to about 95 per cent. For this reason, in the past, in order ultimately to obtain alcohol from the polysaccharides, it was considered necessary to utilize this preliminary separate step to insure hydrolysis of the polysaccharides to the simpler sugars.

It has now been found that certain special strains of yeast may be developed which possess the ability to convert the polysaccharides, as well as the monosaccharides, contained in artichoke-diffusion liquor to alcohol. As explained in the earlier application referred to, when such special yeast strains are contacted with unhydrolyzed diffusion liquor under suitable conditions, conversions of from 90 to 94 per cent. of the carbohydrate content to alcohol are obtained. Such novel strains therefore permit a single step conversion in which the polysaccharides, as well as the monosaccharides, are fermented. The manifold advantages attained by effecting in this one step, that which heretofore required two distinct operations, will quickly be appreciated by those skilled in the art.

This useful and specific function may be developed in certain yeasts in a manner more fully to be described so as to produce, in effect, novel yeast strains or types.

An object of the present invention, therefore, is to improve the alcohol fermentation of tuber diffusion liquor by effecting such fermentation with new yeast strains.

Another objective of the invention is to produce improved yeast strains which are particularly efficacious in the conversion of carbohydrates to alcohol.

With these and other equally important and related objects in view, the invention comprehends the concept of generating improved yeast strains which are characterized by the ability to substantially completely ferment the carbohydrate content of Jerusalem artichokes and similar tubers.

The novel yeast strains contemplated herein may generally be considered as bottom or intermediate fermenting yeasts of the genus Saccharomyces to which, by means of a special development, selection, or acclimatization, is imparted the described additional, specific function. Since such yeasts are peculiarly efficacious in the treatment of Jerusalem artichokes, they may, for the sake of a term, be designated as *Saccharomyces helianthus*. The developed strains, as explained, may be used to ferment the diffusion liquor of, or a mash made from, artichoke tubers under either aerobic or anaerobic conditions to substantially completely convert the carbohydrate content.

The yeast which formed the bases for the new strains are readily available and are found, for example, on grains, such as wheat and corn; on fruits, such as grapes and apples, and in the soil.

In producing the new strains, it is found that the Jerusalem artichoke liquor presents an excellent culture medium. This liquor may be produced by diffusing sliced tubers with warm water at a temperature of about 70 to 80° C. Such liquor usually contains about 12 to 15 or more per cent. of total solids. It has been found advantageous to concentrate such liquor to a syrup in which form it may be stored. When required, for the production of new yeast strains, the syrup may be withdrawn from storage and diluted to the required concentration for use in the culture medium. It will be understood that the liquor which is to be used as a culture medium is sterilized, as by heating in an autoclave to a temperature of substantially from 100° C. to 120° C. for a period of 10 to 15 minutes or more.

When it is desired to propagate the yeast, such sterilized diffusion liquor is diluted so as to adjust the total carbohydrate content to approximately 5 per cent. The hydrogen ion concentration is preferably adjusted to a pH of 4.5 to 5. A series of the cultures is then made by inoculating tubes of such diffusion liquor with a small amount of the grain, fruit, soil, or other yeast source, and the culture is allowed to ferment for a period of from 6 to 7 or more days. During such fermentation, the temperature is preferably maintained at about 30° C.

From this initial series of such cultures, those which show the most vigorous fermentation and largest production of ethyl alcohol are chosen and are then utilized to inoculate additional quantities of the original culture medium. This process of selective inoculation is continued for from 5 to 10 or more transfer cycles, during which the inoculation period is successively diminished from the original period of 5 to 7 days to about 2 days.

The ultimate cultures obtained are then utilized to make plates by employing a solid medium comprising about 1.5 per cent. of agar agar and the diffusion liquor from the artichoke tubers such that the final medium contains about 5 per cent of total carbohydrates. By this procedure, a substantially pure culture of the desired novel strain is produced. In lieu of this method, the yeast cells may be selected by any suitable single cell method.

The novel strains thus produced can then be directly employed for the production of ethyl alcohol and carbon dioxide from the diffusion liquor of artichoke tubers or from a mash made by maceration and cooking of such tubers. The diffusion liquor may be produced in the usual manner by diffusing the tubers with water at 80° C., more or less. If desired, the diffusion liquor may be evaporated to a syrup and stored, diluting to about 20 per cent carbohydrate content before inoculation.

In carrying out the fermentation, it is preferred to develop the inoculum in artichoke diffusion liquor. However, this is not essential, as it has been found that saccharified grain mash or molasses may be employed. In any event, in the fermentation, the amount of the inoculum to the diffusion liquor or mash preferably should be adjusted to between 3 to 10 per cent. It is found that the best results are secured by concentration of the total carbohydrates in the fermentation adjusted to between 12 and 20 percent.

During the fermentation step, the hydrogen ion concentration should be established at between pH 4.5 to 5, and the temperature maintained at approximately 30° C., although this temperature may be allowed to rise to 42° C. as the fermentation proceeds. In these circumstances, it is found that in approximately 2 days, substantially complete conversion is effected. It will be found advisable to aerate the system during the first four to six hours after inoculation, although such aeration is not essential. In any event, aeration should not be continued after about eight hours of fermentation.

With this type of treatment, it will be found that from 92 to 95 per cent. of the total carbohydrates of the artichoke tubers is converted to ethyl alcohol and carbon dioxide.

At the termination of the fermentation step, the fermented diffusion liquor or mash may be treated by distillation methods employed in the art to produce aqueous or anhydrous alcohol.

It is particularly to be observed that the present method of treatment of yeasts, to impart to them the capability of directly converting the polysaccharides, is carefully to be distinguished from prior suggested methods of acclimatization. It has been known in the past that if certain yeast which inherently possesses the ability to convert certain monosaccharides are acclimatized in such monosaccharides, this ability is considerably enhanced. The present method, as will be appreciated, involves the acclimatization of the initial yeast in a heterogeneous culture so as to develop the ability to convert polysaccharides. In other words, the present method induces a new and specific function in the yeast, rather than an increase or enhancement of a preexisting, inherent function.

The following characteristics will serve to more fully identify the novel yeast strains described herein:

Morphological—Yeast grown in beer wort.

| | |
|---|---|
| Size of vegetation cells: | 4.5 to 8 microns by 3 to 6 microns |
| Shape of vegetation cells: | Oval |
| Method of multiplication: | Budding |
| Mycelium: | None |
| Spore fermentation: (On carrot infusion agar) | 1 to 4 spores per ascus, 0.7 to 1.0 microns diameter, nearly round. |

Carbohydrate fermentation (in yeast water medium).
1. Insulin—
2. Starch—
3. Sucrose+
4. Maltose+
5. Lactose—
6. Levulose+
7. Glucose+
8. Mannose+
9. Dextrose+
10. Polylevulosans of *Helianthus tuberosus*—

| | |
|---|---|
| Gelatin liquefaction: | Negative |
| pH range best growth: | 4.5–5.0 |
| Optimum temperature: | 30° C.–35° C. |
| Attenuation: | High |
| Type of growth: | Intermediate or bottom |

While the isolation of *Saccharomyces helianthus* from natural sources has been described, it is to be understood that the same technique may be used to develop cultures of *S. cerevisiae* and *S. anamensis*, which are effective for the stated purpose, namely, the direct conversion of the polylevulosans to alcohol and carbon dioxide. It is believed that in this case the operation is one of selection.

Similarly, *Schizosaccharomyces pombe* and

*Schizosaccharomyces mellacei* may be treated according to the described method to enhance their ability to ferment the polylevulosans of the artichoke and similar tubers.

It will be understood that the invention is susceptible of relatively wide operative modifications; hence, while definite procedures have been outlined, these are given as illustrative of the principles involved, and not necessarily as limiting the invention to the particular methods described.

I claim:

A method of producing improved yeast strains, capable of directly fermenting the polysaccharides contained in Jerusalem artichokes, which comprises, preparing a medium containing such polysaccharides, adjusting the hydrogen ion concentration of the medium to pH 4.5 to 5; inoculating the medium with distillers' yeast and incubating at a temperature of substantially 30° C. for a period of approximately 5 to 7 days; then successively inoculating a similar medium with the yeast propagated in the preceding incubation, while successively diminishing the time of incubation.

LEO M. CHRISTENSEN.